United States Patent
Gerard et al.

(10) Patent No.: US 8,914,419 B2
(45) Date of Patent: Dec. 16, 2014

(54) EXTRACTING SEMANTIC RELATIONSHIPS FROM TABLE STRUCTURES IN ELECTRONIC DOCUMENTS

(71) Applicant: International Business Machines Corporation, Armonk, NY (US)

(72) Inventors: Scott N. Gerard, Wake Forest, NC (US); Mark G. Megerian, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 13/664,144

(22) Filed: Oct. 30, 2012

(65) Prior Publication Data

US 2014/0122535 A1    May 1, 2014

(51) Int. Cl.
*G06F 17/30* (2006.01)
*G06Q 10/10* (2012.01)

(52) U.S. Cl.
CPC ............ *G06Q 10/10* (2013.01); *G06F 17/3043* (2013.01)
USPC .......................................... 707/802; 715/215

(58) Field of Classification Search
CPC ...................................................... G06Q 10/10
USPC ........................... 707/101, 154, 728, 750, 802
See application file for complete search history.

(56) References Cited

U.S. PATENT DOCUMENTS

| | | | |
|---|---|---|---|
| 4,688,195 A | 8/1987 | Thompson et al. | |
| 6,161,103 A * | 12/2000 | Rauer et al. | 1/1 |
| 6,904,428 B2 | 6/2005 | Frieder et al. | |
| 7,412,510 B2 | 8/2008 | Schweitzer et al. | |
| 7,620,665 B1 | 11/2009 | George et al. | |
| 7,631,065 B2 | 12/2009 | Schweitzer et al. | |
| 7,788,580 B1 | 8/2010 | Goodwin et al. | |
| 7,792,823 B2 | 9/2010 | Cain et al. | |
| 9,282,962 | 9/2010 | Brill et al. | |
| 8,010,564 B2 | 8/2011 | Minagawa et al. | |

(Continued)

FOREIGN PATENT DOCUMENTS

| | | |
|---|---|---|
| JP | 05334490 | 12/1993 |
| WO | WO 03/012661 A1 | 3/2003 |

OTHER PUBLICATIONS

"About SemanticTable", SemanticTable.org, Bioinformatics and Systems Engineering (BASE) division, RIKEN, http://semantictable.org, accessed on Oct. 25, 2012, 1 page.

(Continued)

*Primary Examiner* — James Trujillo
*Assistant Examiner* — Thong Vu
(74) *Attorney, Agent, or Firm* — Stephen J. Walder, Jr.; Jeffrey S. LaBaw

(57) ABSTRACT

Mechanisms, in a data processing system, are provided for extracting semantic relationships amongst table contents in a table data structure associated with an electronic document. These mechanisms determine a configuration of cells within the table data structure. The mechanisms identify one or more super-cells within the table data structure based on the determined configuration of cells. The mechanisms also, for each super-cell in the one or more super-cells, converts table data corresponding to the super-cell into a semantic relationship statement for the super-cell, wherein the semantic relationship statement identifies one or more relationships between portions of the table data corresponding to the super-cell. The mechanisms further store the semantic relationship statements for each of the super-cells in association with the table data structure.

25 Claims, 5 Drawing Sheets

(56) References Cited

U.S. PATENT DOCUMENTS

| | | | |
|---|---|---|---|
| 8,037,108 | B1 | 10/2011 | Chang |
| 8,055,661 | B2 | 11/2011 | Lee et al. |
| 8,091,020 | B2 | 1/2012 | Kuppusamy et al. |
| 8,255,789 | B2 * | 8/2012 | Berger et al. ............ 715/215 |
| 8,364,673 | B2 * | 1/2013 | Chang et al. ............ 707/728 |
| 8,442,988 | B2 * | 5/2013 | Draese et al. ............ 707/750 |
| 2002/0078406 | A1 | 6/2002 | Kondoh et al. |
| 2003/0097384 | A1 * | 5/2003 | Hu et al. ............ 707/514 |
| 2004/0030687 | A1 | 2/2004 | Hidaka et al. |
| 2004/0064447 | A1 | 4/2004 | Simske et al. |
| 2004/0117739 | A1 | 6/2004 | Challenger et al. |
| 2006/0173834 | A1 | 8/2006 | Brill et al. |
| 2007/0011183 | A1 | 1/2007 | Langseth et al. |
| 2007/0094006 | A1 | 4/2007 | Todhunter et al. |
| 2009/0171999 | A1 * | 7/2009 | McColl et al. ............ 707/101 |
| 2009/0287678 | A1 | 11/2009 | Brown et al. |
| 2010/0281455 | A1 | 11/2010 | Anand et al. |
| 2011/0066587 | A1 | 3/2011 | Ferrucci et al. |
| 2011/0125734 | A1 | 5/2011 | Duboue et al. |
| 2011/0126275 | A1 | 5/2011 | Anderson et al. |
| 2011/0320189 | A1 | 12/2011 | Carus et al. |
| 2012/0004905 | A1 | 1/2012 | Bobick et al. |
| 2012/0011115 | A1 | 1/2012 | Madhavan et al. |
| 2012/0303661 | A1 | 11/2012 | Blohm et al. |
| 2013/0007055 | A1 | 1/2013 | Brown et al. |
| 2013/0018652 | A1 | 1/2013 | Ferrucci et al. |
| 2013/0060774 | A1 | 3/2013 | Shepherd et al. |
| 2013/0066886 | A1 | 3/2013 | Bagchi et al. |
| 2013/0185307 | A1 | 7/2013 | Ei-Yaniv et al. |

OTHER PUBLICATIONS

"Gleaning Resource Descriptions from Dialects of Languages (GRDDL), WC3 Recommendation", W3C, http://www.w3.org/TR/grddl/, Sep. 11, 2007, 17 pages.

"SPARQLMotion Getting Started Guide", TopQuadrant, Inc., http://www.topquadrant.com/products/SPARQLMotion_docs/SPARQLMotion_guide.html, accessed on Oct. 25, 2012, 6 pages.

Golbeck, Jennifer et al., "New Tools for the Semantic Web", Knowledge Engineering and Knowledge Management: Ontologies and the Semantic Web, Lecture Notes in Computer Science, DOI: 10.1007/3-540-45810-7_35, vol. 2473/2002, 2002, 11 pages.

IBM, "Dynamic Model-Extracting Table Widget", ip.com, IPCOM000010243D, Nov. 11, 2002, 7 pages.

Langegger, Andreas et al., "XLWrap—Querying and Integrating Arbitrary Spreadsheets with SPARQL", Proceedings of the 8th International Semantic Web Conference, 2009, Springer-Verlag Berlin, Heidelberg, ISBN: 978-3-642-04929-3, 2009, pp. 359-374.

Byron, et al., "Discovering Relationships in Tabular Data", filed Jul. 1, 2013, U.S. Appl. No. 13/932,435.

Byron, et al., "Subject-Matter Analysis of Tabular Data", filed Jul. 18, 2013, U.S. Appl. No. 13/945,259.

U.S. Appl. No. 13/925,015, 1 page.

High, Rob, "The Era of Cognitive Systems: An Inside Look at IBM Watson and How it Works", IBM Corporation, http://ip.com/pdf/redbook/REDP495500.pdf, 2012, 16 pages.

Pinto, David, "Table Extraction Using Conditional Random Fields", http://scholarworks.umass.edu/cs_faculty_pubs/76, 2003, Computer Science Department Faculty Publication Series, Paper 76, 9 pages.

Piris, Ruben N., "Extracting Knowledge Bases from Table-Structured Web Resources Applied to the Semantic Based Requirements Engineering Methodology SoftWiki", http://subs.emis.de/LNI/Proceedings/Proceedings176/1008.pdf, 2010, pp. 992-995.

Pivk, Aleksander et al., "From Tables to Frames", http://people.aifb.kit.edu/pci/FromTablesToFramesTech.pdf, Jul. 19, 2004, 1-17.

Tao, Cui et al., "Automatic Hidden-Web Table Interpretation, Conceptualization, and Semantic Annotation", Department of Computer Science, Brigham Young University, Provo, UT 84602, USA, 2009, pp. 1-21.

Yuan, Michael J., "Watson and healthcare, How natural language processing and semantic search could revolutionize clinical decision support", IBM developerWorks, IBM Corporation, Apr. 12, 2011, 14 pages.

U.S. Appl. No. 14/082,862, 1 page.

Byron, et al., "Discovering Relationships in Tabular Data", filed Nov. 26, 2013, U.S. Appl. No. 14/090,184.

Byron, et al., "Subject-Matter Analysis of Tabular Data", filed Nov. 26, 2013, U.S. Appl. No. 14/090,230.

Byron, et al., "Adapting Tabular Data for Narration", filed Mar. 15, 2013, U.S. Appl. No. 13/838,130.

U.S. Appl. No. 14/262,288, 1 page.

Byron, Donna K. et al., "Discovering Title Information for Structured Data in a Document", U.S. Appl. No. 13/778,901, filed Feb. 27, 2013.

* cited by examiner

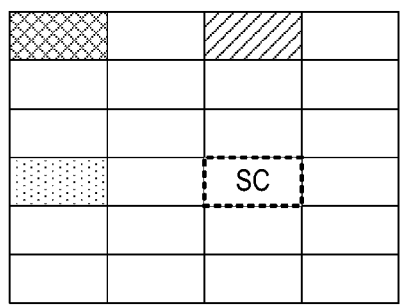
*FIG. 5A*
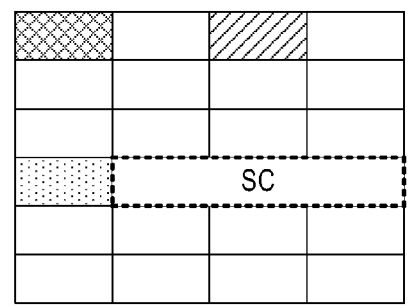
*FIG. 5B*
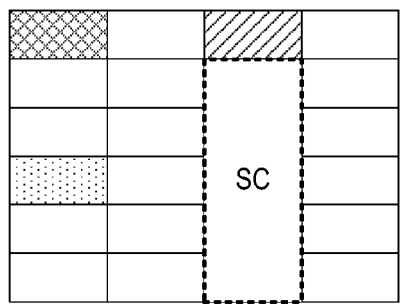
*FIG. 5C*
| ASSET | | LIABILITY | |
|---|---|---|---|
|  |  |  |  |
| SC |  | SC |  |
|  |  |  |  |
|  |  |  |  |
*FIG. 5D*

EXTRACTING SEMANTIC RELATIONSHIPS FROM TABLE STRUCTURES IN ELECTRONIC DOCUMENTS

BACKGROUND

The present application relates generally to an improved data processing apparatus and method and more specifically to mechanisms for extracting semantic relationships from table structures in electronic documents.

Natural language processing (NLP) systems, question and answer creation (Q&A) systems, and the like, utilize analysis of textual content of electronic documents to perform their various functions. For example, the Q&A system known as Watson™, available from International Business Machines (IBM) Corporation of Armonk, N.Y., analyzes unstructured textual content of electronic documents to answer questions and derive conclusions from the textual content.

While these systems work well on textual content, many times knowledge and information is presented or captured in table structures in electronic documents. Such NLP and Q&A systems cannot adequately process such table structures to glean the information and knowledge presented in these table structures.

SUMMARY

In one illustrative embodiment, a method, in a data processing system, is provided for extracting semantic relationships amongst table contents in a table data structure associated with an electronic document. The method comprises determining a configuration of cells within the table data structure. The method further comprises identifying one or more super-cells within the table data structure based on the determined configuration of cells. Moreover, the method comprises, for each super-cell in the one or more super-cells converting table data corresponding to the super-cell into a semantic relationship statement for the super-cell, wherein the semantic relationship statement identifies one or more relationships between portions of the table data corresponding to the super-cell. The method further comprises storing the semantic relationship statements for each of the super-cells in association with the table data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5A-5D illustrates other example table structures with which the illustrative embodiments may be implemented;

DETAILED DESCRIPTION

Figure 1:
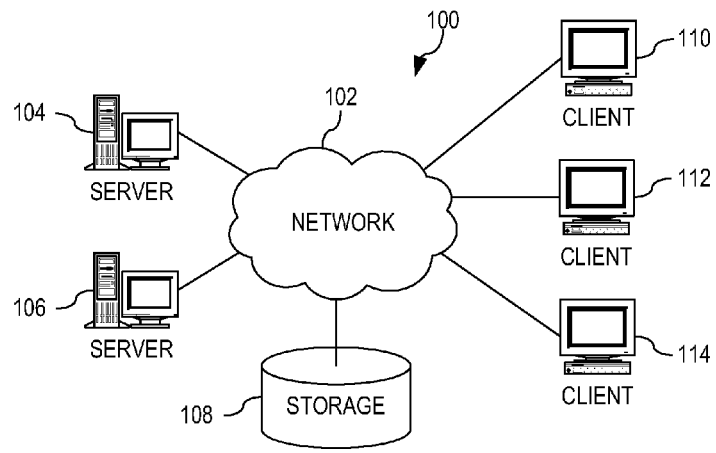
FIG. 1 is an example diagram of a distributed data processing system in which aspects of the illustrative embodiments may be implemented.

The illustrative embodiments provide mechanisms for extracting semantic relationships from table structures embedded in, or otherwise associated with, electronic documents. As noted above, natural language processing (NLP), question and answer creation (Q&A) systems, and the like, are not able to properly process such table structures since they are not configured to understand the structure of such table structures or recognize the relationships between the information contained in such tables in a meaningful way. This is because such NLP and Q&A systems, such as IBM Corporation's Watson™ Q&A system, operate on information presented in sentence structures and analyze the syntax of a properly formed sentence to gather information about the content of the electronic document.

The illustrative embodiments provide mechanisms for mapping table structures to textual statements representing the information in those table structures or to other forms of structured information that the analysis engines may be configured to utilize. The illustrative embodiments provide a solution to the problem of, given a table structure in an electronic document, how one can extract the meaning, or semantics, of the table structure so that these semantics may be processed programmatically.

That is, many table structures have a rich set of relationships between the cells in the table structure. These relationships may include horizontal relationships to header and footer cells in the same row, vertical relationships to header and footer cells in the same column, tabular/contextual relationships to the table structure's "corner" cells and to the table structure's caption, neighbor relationships between neighboring cells, and the like. The illustrative embodiments provide mechanisms for extracting such semantic relationships from table structures and formulating them into a structure usable by an analysis engine. This formulation may include, for example, generating a sentence structure representing the semantic relationships between information in the table structure, a Structured Query Language (SQL) statement having content representing these semantic relationships, semantic triplets, e.g., Resource Description Framework (RDF) or N3, or the like. The illustrative embodiments will be described using 2-dimensional table structures for ease of explanation but it will be appreciated by those of ordinary skill in the art that the mechanisms of the illustrative embodiments may be implemented with table structures having more than 2 dimensions as may be provided in a computer model, data warehouses, or the like.

Extracting the meaning (or semantics) from a table structure in accordance with one illustrative embodiment, comprises the following three operations: structure identification, tuple generation, and construction of semantic representations. With regard to structure identification, the size of the row header, row footer, column header, and column footer are determined as well as the size of a super-cell in the table structure. This provides the structure information used to parse the table structure to extract the content of the table structure and relationships based on the structure of the table.

The tuple generation involves constructing a tuple for each super-cell. The tuple contains the super-cell's contents (neighbor related cells) and the contents of all of the super-cell's horizontally, vertically, and tabularly-related cells. The construction of semantic representations involves the use of a table structure's template to independently convert each tuple to a target semantic representation. The resulting semantic representations may be inserted in, or otherwise associated with, the table structure in the electronic document or to the electronic document generally. As a result, the semantic representations may be processed by the NLP, Q&A, or other analysis system that utilizes the semantic representations.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
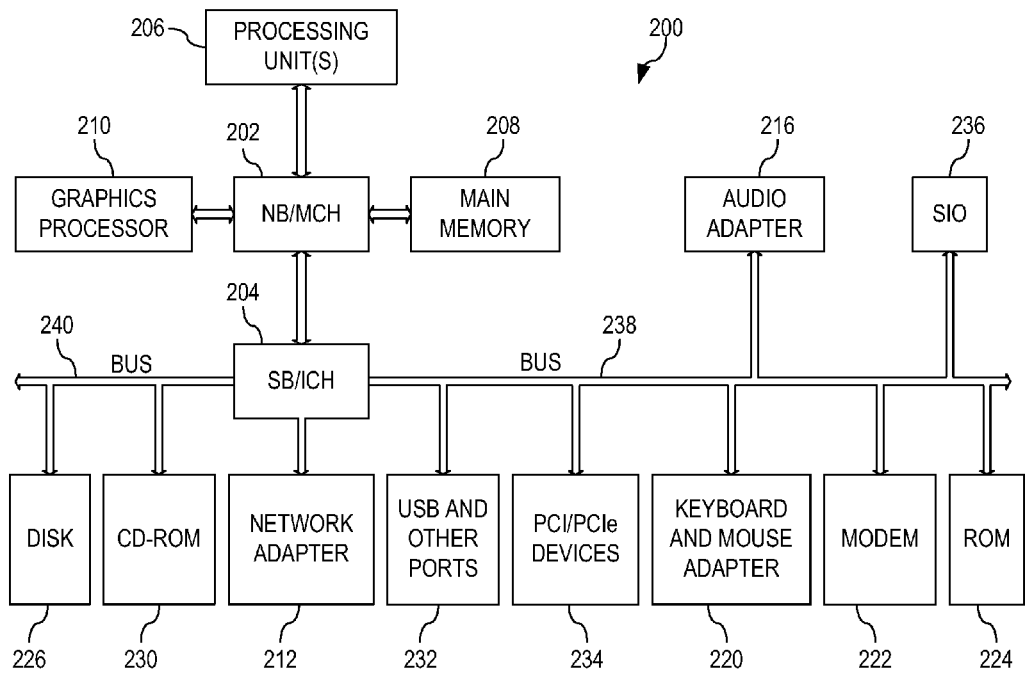
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, the illustrative embodiments of the present invention may be implemented in any one, or a plurality, of the computing devices illustrated in FIG. 1 including the servers 104, 106 and/or clients 110-114. In some illustrative embodiments, the mechanisms of the illustrative embodiments are implemented in conjunction with an analysis engine for analyzing electronic documents stored in one or more storage systems/devices. This analysis engine may take many different forms including a natural language processing (NLP) analysis engine, a Question and Answer Creation (Q&A) system, or the like. The electronic documents that are analyzed by the mechanisms of the illustrative embodiments, and the analysis engines with which the illustrative are associated, may be stored locally to the computing device upon which the mechanisms of the illustrative embodiment and the analysis engine execute, may be located remotely on storage systems/devices associated with other computing devices and accessible via the one or more networks 102, may comprise both locally and remotely maintained electronic documents, and may be distributed across multiple computing devices and storage systems/devices accessible via one or more networks 102. In one illustrative embodiment, the electronic documents (capable of having embedded table structures or table structures associated with the electronic documents) may be any electronic document, web page, or collection of content available from any client computing device, server, network attached storage system, or the like.

For purpose of the following description, it will be assumed that the mechanisms of the illustrative embodiments are implemented in conjunction with a Q&A analysis engine. The Q&A analysis engine takes an input question, analyzes it, and returns results indicative of the most probable answer to the input question. Q&A systems provide automated mechanisms for searching through large sets of sources of content, e.g., electronic documents, and analyze them with regard to an input question to determine an answer to the question and a confidence measure as to how accurate an answer is for answering the input question.

One such Q&A system is the Watson™ system available from International Business Machines (IBM) Corporation of Armonk, N.Y. The Watson™ system is an application of advanced natural language processing (NLP), information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various U.S. patent application Publications describe various types of question and answer systems which may also be used in conjunction with the mechanisms of the illustrative embodiments. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model. Any known, or later developed question and answer creation system may be used with the mechanisms of the illustrative embodiments without departing from the spirit and scope of the illustrative embodiments.

The mechanisms of the illustrative embodiments may operate as a pre-processor of table structure content embedded in, or otherwise associated with, electronic documents that are to be analyzed by the Q&A system, or other analysis engine that has an identifiable format of content that is able to be processed by the analysis engine. In the case of Q&A system, the identifiable format is a sentence structure format. This sentence structure format is not a rigid format requiring a particular ordering of information, but is a flexible, unstructured format in that the Q&A system can analyze sentences have various formats and extract syntax of the sentences. In other embodiments, the format may have a less flexible structure and may require that the identifiable format have a particular ordering of information.

The illustrative embodiments may operate on table structure content associated with an electronic document to convert the table structure content to a format that the analysis engine is able to process to obtain syntax information. The illustrative embodiments process the table structure content to determine the structure of the table structure content, generate a representation of the information extracted from the table structure content, and then use the representation of the information extracted from the table structure content to construct a semantic representation of this information having a format that is able to be processed by the associated analysis engine.

Figure 3:
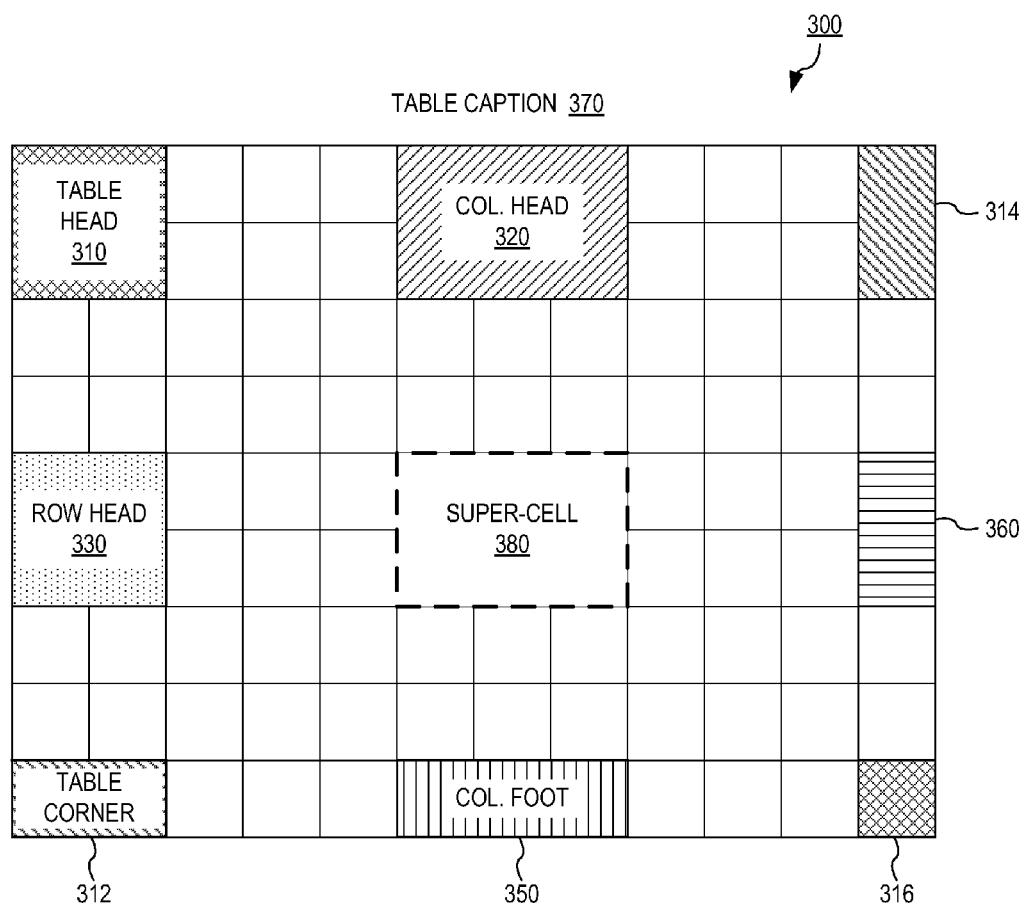
FIG. 3 is an example diagram of a table structure showing elements of the table structure that are used for determining the semantics of the table structure in accordance with one illustrative embodiment.

In order to more clearly understand the operations performed by the mechanisms of the illustrative embodiments, it is first important to understand a general structure and content of a table structure that may be embedded in, or otherwise associated with, an electronic document. FIG. 3 is an example diagram of a table structure showing elements of the table structure that are used for determining the semantics of the table structure in accordance with one illustrative embodiment. The diagram shown in FIG. 3 illustrates the cell structure of an example table structure. It should be appreciated that this is only an example and other table structures may have different structures which are identifiable by the mechanisms of the illustrative embodiments.

As shown in FIG. 3, the table structure 300 comprises a plurality of cells, represented as boxes in FIG. 3. These cells may store different types of information including headers, footers, and information content. In the example shown in FIG. 3, cells 310-316 are table corner cells, cells 320 are column header cells, cells 330 are row header cells, cells 350 are column footer cells, and cells 360 are row footer cells. The table corner cells 310-316 may include one or more column header/footer cells and row header/footer cells. In the example shown in FIG. 3, the table corner cell 310 may be considered a table header that provides header information about the table itself. The other table corner cells 312-316 may store additional table header/footer information as well. The table structure 300 further comprises one or more table captions 370.

Each horizontal row in the table structure 300 has zero or more row header cells 330 and zero or more row footer cells 360. Each vertical column in the table structure 300 has zero or more column header cells 320 and zero or more column footer cells 350. The body of the table structure 300 (inside the table headers 310 and table footers 340) contains super-cells 380 which are non-overlapping collections of related cells. Preferably, these super-cells 380 have a rectangular shape, but this is not required. These super-cells 380 may be comprised of one or more cells within the table. Similarly, the other portions of the table structure 300, e.g., headers, footers, and the like, may likewise be comprised of one or more cells of the table structure 300.

The sizes of the row headers 330, row footers 360, column headers 320, and column footers 350 define blocks of cells in the corners of the table structure 300 that apply to the entire table structure 300. The one or more table captions 370, which are optional, also apply to the entire table structure 300.

The sizes and configuration of the table structure 300 may be identified by metadata associated with the table structure 300 or may be automatically identified through an analysis of the arrangement of cells and the content contained within the cells. For example, when creating the table structure 300, the creator of the table structure 300 may specify which cells of the table structure correspond to a column header, column footer, row header, and row footer. Moreover, the creator may set forth the sizes, in numbers of cells, of the super-cells within the body of the table structure 300. Alternatively, information may be provided that indicates the type of table structure 300, e.g., numbers of rows, numbers of columns, and the content may be analyzed to determine which portions of the table structure correspond to headers/footers and which portions correspond to body content. A default setting of super-cell size may be selected if one is not given or is not able to be discerned from the analysis of the table structure 300.

The automated analysis may involve, for example, looking for textual content indicative of headers, such as general terms as opposed to specific terms, e.g., "Name" is general, "Steve" is a specific instance of "Name". Numerical entries are often more indicative of body content than headers/footers and thus, may be considered body content as part of the automated analysis. Cells on the outer boundaries of the table structure tend to be headers/footers, as opposed to inner cells which are body content cells. As a further example, the terms "total," "subtotal", and the like may be indicative of headers/footers for columns/rows. The analysis may take into account many different characteristics of the cells of a table structure 300 when evaluating them to determine whether the cells are part of a header, footer, or body content, e.g., super-cell. Any mechanism and/or logic for identifying the portions of a table structure may be used without departing from the spirit and scope of the illustrative embodiments.

For purposes of the following description, it will be assumed that the structure and arrangement of the table structure 300 is specified in metadata associated with the table structure 300 which may be manually input or automatically generated either when the table structure 300 is created or at some point thereafter. In addition, a creator of the table structure 300, or other person interested in describing the content of the table structure 300, may provide a template statement that indicates the way in which the content of the table structure 300 can be represented. For example, in the depicted example, the template statement might be of the type "The cost of $rowhead(1,1) in year $colhead(1,1) is $cell(1,1)" where the row header is a product name, the column header is a year, and the body content cells comprise cost information. This template statement may be used to generate a semantic representation of the information contained in the table structure 300 in a format that is able to be processed by an associated analysis engine, e.g., a NLP engine, Q&A engine, or the like.

Knowing the structure and arrangement of cells within the table structure 300, the mechanisms of the illustrative embodiments generate tuples (ordered sets of values) for each super-cell 380 in the body of the table structure 300. The tuples provide a standardized format for information gathered from the table structure 300 such that this information may be mapped to a semantic representation of the table as defined by a template. By generating the tuple, the information may then be formatted for different types of analysis engines or for different purposes based on the particular template used to generate the semantic representation of the table structure 300. For example, a first template may be used to generate a natural language sentence semantic representation of the table structure 300 and a second template may be used to generate a SQL statement representing the table structure 300. Both templates may make use of the same tuple to generate the semantic representations corresponding to the templates. Furthermore, as shown in FIG. 3, the super-cells 380, headers, and footers may comprise multiple cells and the tuple organizes this information according to each super-cell 380.

Figure 4:
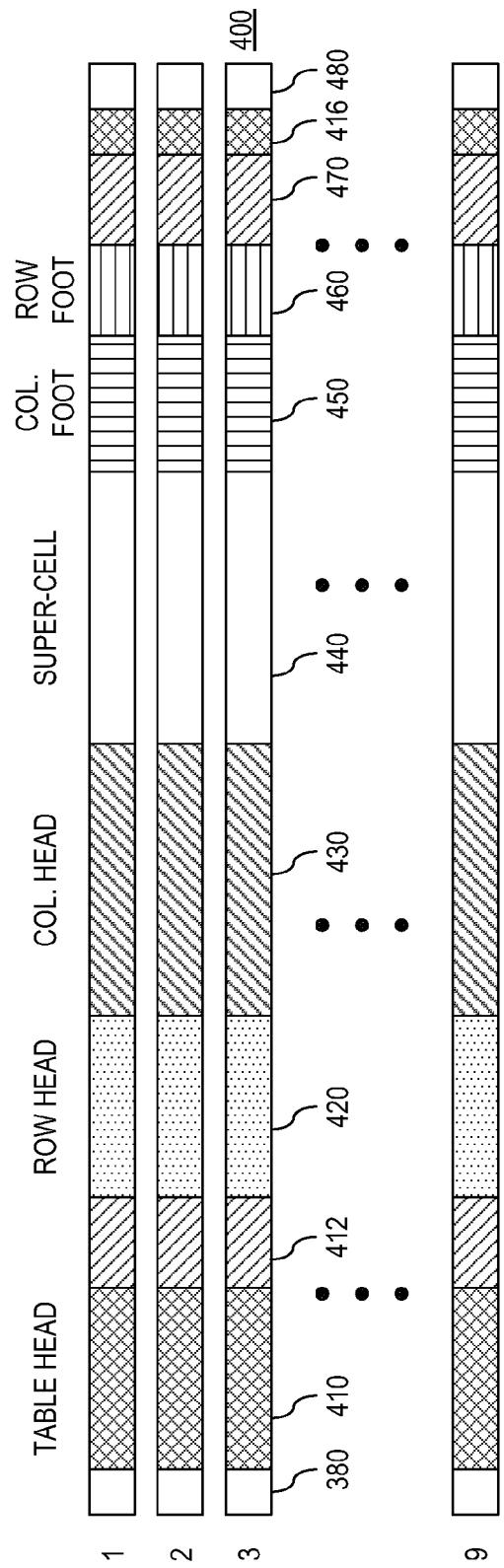
FIG. 4 is an example diagram illustrating an example organization of tuples in accordance with one illustrative embodiment.

FIG. 4 is an example diagram illustrating an example organization of tuples in accordance with one illustrative embodiment. The particular example shown in FIG. 4 is for the example table structure 300 in FIG. 3, but the illustrative embodiments should not be construed as being limited to operating on table structures 300 having only the specific structure shown in FIG. 3.

As shown in FIG. 4, there is a separate tuple for each super-cell 380 in the table 300, there is a separate tuple 400 generated. Thus, in the tuple data structure shown in FIG. 4, there are 9 separate tuples, one for each of the 9 super-cells 380 in the body of the table structure 300. Each tuple 400 comprises entries for the table caption 370 which is common amongst the 9 separate tuples. Each tuple 400 comprises a corresponding table header portion 410 (corresponding to table header 310), a row header portion 420 (corresponding to row header 330), a column header portion 430 (corresponding to column header 320), a super-cell portion 440 (corresponding to super-cell 380), a column footer portion 450 (corresponding to column footer 350), a row footer portion 460 (corresponding to row footer 360), a second table header portion 470 (corresponding to table header 340), and a template portion 480 specifies one or more templates or identifiers of templates with which the tuple is to be used. Additional portions 412 and 416 may be provided for table corner portions as well.

The template portion 480 is optional and may be populated based on the particular templates associated with the table at the time that the tuple 400 is created. Alternatively, the template portion 480 may be dynamically populated, or the templates dynamically determined, based on the particular templates to be used for the analysis engine that is operating on the electronic document and its embedded or associated table structure 300. The tuple 400 may further contain other application-specific information, e.g., super-cell row and column numbers or the like, not specifically shown in FIG. 4, either in addition to the information shown or in replacement of portions of the information shown in FIG. 4, without departing from the spirit and scope of the illustrative embodiments.

The illustrative embodiments provide logic for mapping the information in the table structure 300 into the tuples 400 of the tuple data structure of FIG. 4. Having generated the tuples 400 via the mapping logic of the illustrative embodiments, the mechanisms of the illustrative embodiments operate on the templates to generate semantic representations of the information stored in the tuples 400. That is, the illustrative embodiments apply the template for the table structure 300 to the tuples to generate a separate semantic statement for each tuple. Such application of the template comprises populating the variables in the template with the corresponding information from the corresponding portions of the tuple. The result is a set of semantic statements describing the content and relationships between content in the table structure 300. These statements may then be stored in, or in association with, the table structure 300 and/or the electronic document with which the table structure 300 is associated.

Separate templates may be applied to the tuples 400 to generate separate semantic statements usable by different types of analysis engines or usable for different purposes. Thus, the semantic statements associated with the table structure 300 may comprise multiple semantic statements for each tuple 400, one for each template.

As a result, when an analysis engine processes the electronic document having the associated table structure 300, the analysis engine may identify the semantic statements associated with the table structure 300 that are able to be processed by the analysis engine. The analysis engine may then perform its normal analysis operations, e.g., NLP operations, Q&A operations, or the like, on these semantic statements to generate corresponding analysis results.

Thus, the illustrative embodiments provide mechanisms for processing table structures associated with electronic documents so as to generate semantic representations of the relationships between the information contained in the table structures. These semantic representations are able to be processed by NLP analysis engines, Q&A analysis engines, and the like. Thus, the mechanisms of the illustrative embodiments allow table structures that were previously not able to be processed by these types of analysis engines to be converted to a semantic representation that is able to be processed by the analysis engine.

As mentioned above, the table structure 300 shown in FIG. 3 is only an example of one possible table structure 300 that is able to be processed by the mechanisms of the illustrative embodiments. The illustrative embodiments are not limited to any particular type of table structure 300 so long as the arrangement and configuration of the table structure 300 is able to be identified, either through analysis of the table structure 300 or through processing of metadata associated with the table structure 300.

FIGS. 5A-5D illustrates other example table structures with which the illustrative embodiments may be implemented. FIG. 5A illustrates a two-dimensional table structure. FIG. 5B illustrates a one dimensional by row table structure. FIG. 5C illustrate a one dimensional by column table structure. FIG. 5D illustrates a side-by-side table structure. The table structures in FIGS. 5A-5C are the most common table structures with FIG. 5D being less common but utilized in a sufficient number of accounting and financial instances to warrant consideration. The illustrative embodiments are able to identify these various types of table structures and generate tuples for the super-cells in the body of these table structures using the methodology and mechanisms previously described above.

Figure 6:
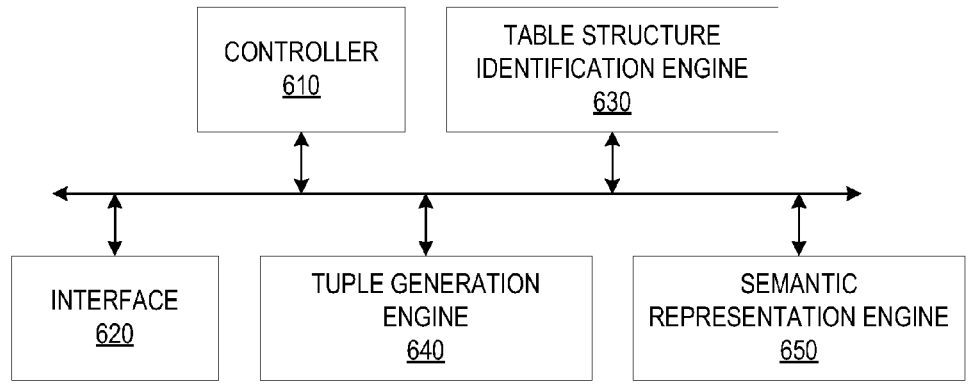
FIG. 6 is an example block diagram of a table structure syntax extraction engine in accordance with one illustrative embodiment.

FIG. 6 is an example block diagram of a table structure syntax extraction engine in accordance with one illustrative embodiment. The elements shown in FIG. 6 may be implemented in hardware, software, or any combination of hardware and software. In one illustrative embodiment, the mechanisms of FIG. 6 may be implemented as software instructions executed by one or more hardware elements. For example, the elements of FIG. 6 may be implemented as software instructions loaded into one or more memories and executed by one or more processors.

As shown in FIG. 6, the table structure syntax extraction engine 600 comprises a controller 610, an interface 620, a table structure identification engine 630, a tuple generation engine 640, and a semantic representation engine 650. The controller 610 controls the overall operation of the table structure syntax extraction engine 600 and orchestrates the operation of the other elements 620-650. The interface 620 provides a communication interface through which table structure information may be received and semantic representations of the table structure information may be output. The interface 620 provides a communication pathway through which the table structure syntax extraction engine 600 may communicate with one or more analysis engines with which the table structure syntax extraction engine 600 works.

The table structure identification engine 630 provides logic for determining the structure of the table. This may involve processing metadata associated with the table that identifies the table's structure or analyzing the table to determine the structure. The structure may be specified in terms of sizes of the row header, row footer, column header, column footer, the super-cell, and the like. This information may be used to identify the various cells in the table to determine which cells correspond to different parts of the table, e.g., row header/footer, column header/footer, super-cells in the body of the table, and the like.

The tuple generation engine 640 takes the structure information for the table as determined by the table structure identification engine 630 and uses this structure information to map the content of the table to tuples, one for each super-cell in the table, which may be stored for later retrieval, such as by semantic representation engine 650 as described hereafter. These tuples essentially map the content from the table into a format that may be used to generate a semantic representation of the table comprising a separate semantic statement for each super-cell.

The tuples generated by the tuple generation engine 640 are provided to the semantic representation engine 650. The semantic representation engine 650 applies one or more semantic representation templates to the tuples generated by the tuple generation engine 640. As mentioned above, these templates may be associated with the tuples when they are generated or may otherwise be applied at a later time dynamically. For example, along with the table information that is input to the table structure syntax extraction engine 600, the template(s) may also be input for application by the semantic representation engine 650. The result generated by the semantic representation engine 650 is a set of semantic statements defining the relationships between content in the input table that are formatted for processing by an associated analysis engine, such as a NLP engine, Q&A engine, or the like. These semantic statements may be stored as part of the table structure, the electronic document associated with the table structure, or as a separate data structure linked to the table structure and/or electronic document. The association of these semantic statements allows an analysis engine to extract the semantic relationship information from the table to perform its analysis operations on the table structure. These semantic statements may be natural language sentence statements, SQL statements, or the like.

Figure 7:
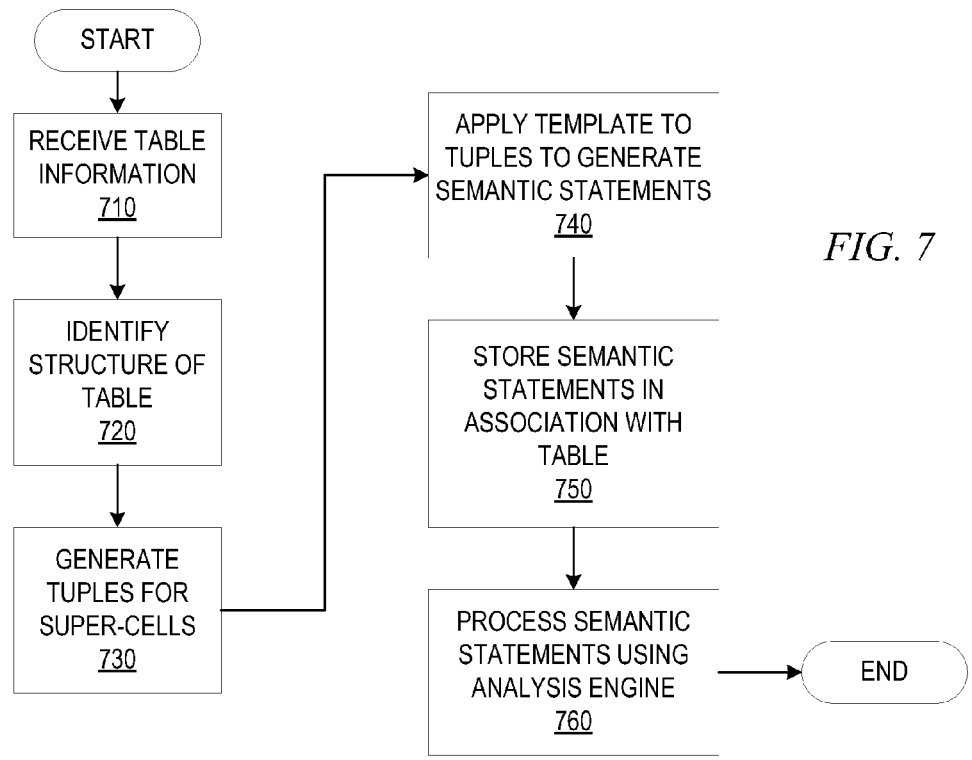
FIG. 7 is an flowchart outlining an example operation for extracting table structure syntax information and formulating a semantic representation of the table structure in accordance with one illustrative embodiment.

FIG. 7 is a flowchart outlining an example operation for extracting table structure syntax information and formulating a semantic representation of the table structure in accordance with one illustrative embodiment. The operation outlined in FIG. 7 may be implemented, for example, by the table structure syntax extraction engine 600 in FIG. 6.

As shown in FIG. 7, the operation starts by receiving table structure information as input (step 710). This may be done, for example, in response to an analysis engine encountering a table structure when analyzing an electronic document, as part of a pre-processing step of an electronic document before operations are performed by an analysis engine, in response to a table being inserted into, or created as part of, an electronic document, or any of a number of other possible events that are appropriate for initiating the generation of semantic representations of table structures in electronic documents.

In response to receiving the table structure information, the structure of the table is identified (step 720). This may include, for example, determining the size of the headers, footers, super-cells, and the like. The determination of the structure of the table may comprise analyzing metadata associated with the table and provided as part of the table structure information or performing analysis of the content of the table to identify portions corresponding to headers, footers, body cells, and the like. After determining the structure of the table, tuples are generated for each of the super-cells in the body of the table using mapping logic to map the content of the table to a tuple for each super-cell (step 730). The tuples are then processed using a template to generate a semantic statement corresponding to the tuples such that each tuple generates one or more semantic statements defining the relationship between the content of the super-cell corresponding to the tuple (step 740). The semantic statements are then stored in association with the table structure (step 750) for later use by an analysis engine (step 760). The operation then terminates.

Thus, as noted above, the illustrative embodiments provide mechanisms for converting table structures to a form that is able to be processed by analysis engines, such as NLP analysis engines, Q&A analysis engines, and the like. The conversion comprises determining the structure of the table, generating a tuple representation of each super-cell in the table, and applying one or more templates to the tuples to generate semantic statements representing the relationships between the content of the super-cells in the table.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for extracting semantic relationships amongst table contents in a table data structure associated with an electronic document, comprising:
   determining, by the data processing system, a configuration of cells within the table data structure;
   identifying, by the data processing system, one or more super-cells within the table data structure based on the determined configuration of cells;
   for each super-cell in the one or more super-cells, converting table data corresponding to the super-cell into a semantic relationship statement for the super-cell, wherein the semantic relationship statement identifies one or more relationships between portions of the table data corresponding to the super-cell; and
   storing, by the data processing system, the semantic relationship statements for each of the super-cells in association with the table data structure.

2. The method of claim 1, wherein converting table data corresponding to the super-cell into a semantic relationship statement comprises, for each super-cell:
   mapping, by the data processing system, contents of the table data structure associated with the super-cell to a tuple data structure having a defined format; and
   generating a semantic relationship statement for the super-cell based on the tuple data structure for the super-cell.

3. The method of claim 2, wherein generating the semantic relationship statement for the super-cell based on the tuple data structure for the super-cell comprises applying a semantic relationship statement template to the tuple data structure to generate a semantic relationship statement for the super-cell.

4. The method of claim 1, further comprising:
performing an analysis operation for analyzing the electronic document using semantic relationship statements associated with the table data structure.

5. The method of claim 4, wherein the analysis operation comprises at least one of a natural language processing operation or a question and answer creation operation performed on content of the electronic document, wherein the content of the electronic document comprises the table data structure.

6. The method of claim 1, wherein the semantic relationship statement comprises a natural language sentence structure configured for parsing by a natural language processing analysis engine.

7. The method of claim 1, wherein the semantic relationship statement comprises at least one of a Structured Query Language (SQL) statement, a Resource Description Framework (RDF) semantic triplet, or a N3 semantic triplet.

8. The method of claim 1, wherein determining a configuration of cells within the table data structure comprises retrieving metadata associated with the table data structure that identifies sizes of portions of the table data structure and a configuration of portions of the table data structure.

9. The method of claim 1, wherein determining a configuration of cells within the table data structure comprises performing automatic analysis of the content of the table data structure to identify portions of the table data structure corresponding to headers, footers, and super-cells of the table data structure.

10. A computer program product comprising a computer readable storage medium having a computer readable program stored therein, wherein the computer readable program, when executed on a computing device, causes the computing device to:
determine a configuration of cells within the table data structure;
identify one or more super-cells within the table data structure based on the determined configuration of cells;
convert, for each super-cell in the one or more super-cells, table data corresponding to the super-cell into a semantic relationship statement for the super-cell, wherein the semantic relationship statement identifies one or more relationships between portions of the table data corresponding to the super-cell; and
store the semantic relationship statements for each of the super-cells in association with the table data structure.

11. The computer program product of claim 10, wherein the computer readable program cause the computing device to convert table data corresponding to the super-cell into a semantic relationship statement at least by, for each super-cell:
mapping contents of the table data structure associated with the super-cell to a tuple data structure having a defined format; and
generating a semantic relationship statement for the super-cell based on the tuple data structure for the super-cell.

12. The computer program product of claim 11, wherein the computer readable program causes the computing device to generate the semantic relationship statement for the super-cell based on the tuple data structure for the super-cell at least by applying a semantic relationship statement template to the tuple data structure to generate a semantic relationship statement for the super-cell.

13. The computer program product of claim 10, wherein the computer readable program further causes the computing device to:
perform an analysis operation for analyzing the electronic document using semantic relationship statements associated with the table data structure.

14. The computer program product of claim 13, wherein the analysis operation comprises at least one of a natural language processing operation or a question and answer creation operation performed on content of the electronic document, wherein the content of the electronic document comprises the table data structure.

15. The computer program product of claim 10, wherein the semantic relationship statement comprises a natural language sentence structure configured for parsing by a natural language processing analysis engine.

16. The computer program product of claim 10, wherein the semantic relationship statement comprises at least one of a Structured Query Language (SQL) statement, a Resource Description Framework (RDF) semantic triplet, or a N3 semantic triplet.

17. The computer program product of claim 10, wherein the computer readable program causes the computing device to determine a configuration of cells within the table data structure at least by retrieving metadata associated with the table data structure that identifies sizes of portions of the table data structure and a configuration of portions of the table data structure.

18. The computer program product of claim 10, wherein the computer readable program causes the computing device to determine a configuration of cells within the table data structure at least by performing automatic analysis of the content of the table data structure to identify portions of the table data structure corresponding to headers, footers, and super-cells of the table data structure.

19. An apparatus, comprising:
a processor; and
a memory coupled to the processor, wherein the memory comprises instructions which, when executed by the processor, cause the processor to:
determine a configuration of cells within the table data structure;
identify one or more super-cells within the table data structure based on the determined configuration of cells;
convert, for each super-cell in the one or more super-cells, table data corresponding to the super-cell into a semantic relationship statement for the super-cell, wherein the semantic relationship statement identifies one or more relationships between portions of the table data corresponding to the super-cell; and
store the semantic relationship statements for each of the super-cells in association with the table data structure.

20. The apparatus of claim 19, wherein the instructions cause the processor to convert table data corresponding to the super-cell into a semantic relationship statement at least by, for each super-cell:
mapping contents of the table data structure associated with the super-cell to a tuple data structure having a defined format; and
generating a semantic relationship statement for the super-cell based on the tuple data structure for the super-cell.

21. The apparatus of claim 20, wherein the instructions cause the processor to generate the semantic relationship statement for the super-cell based on the tuple data structure for the super-cell at least by applying a semantic relationship statement template to the tuple data structure to generate a semantic relationship statement for the super-cell.

22. The apparatus of claim 19, wherein the instructions further cause the processor to:

perform an analysis operation for analyzing the electronic document using semantic relationship statements associated with the table data structure.

23. The apparatus of claim 22, wherein the analysis operation comprises at least one of a natural language processing operation or a question and answer creation operation performed on content of the electronic document, wherein the content of the electronic document comprises the table data structure.

24. The apparatus of claim 19, wherein the semantic relationship statement comprises a natural language sentence structure configured for parsing by a natural language processing analysis engine.

25. The apparatus of claim 19, wherein the instructions cause the processor to determine a configuration of cells within the table data structure at least by retrieving metadata associated with the table data structure that identifies sizes of portions of the table data structure and a configuration of portions of the table data structure.

* * * * *